UNITED STATES PATENT OFFICE.

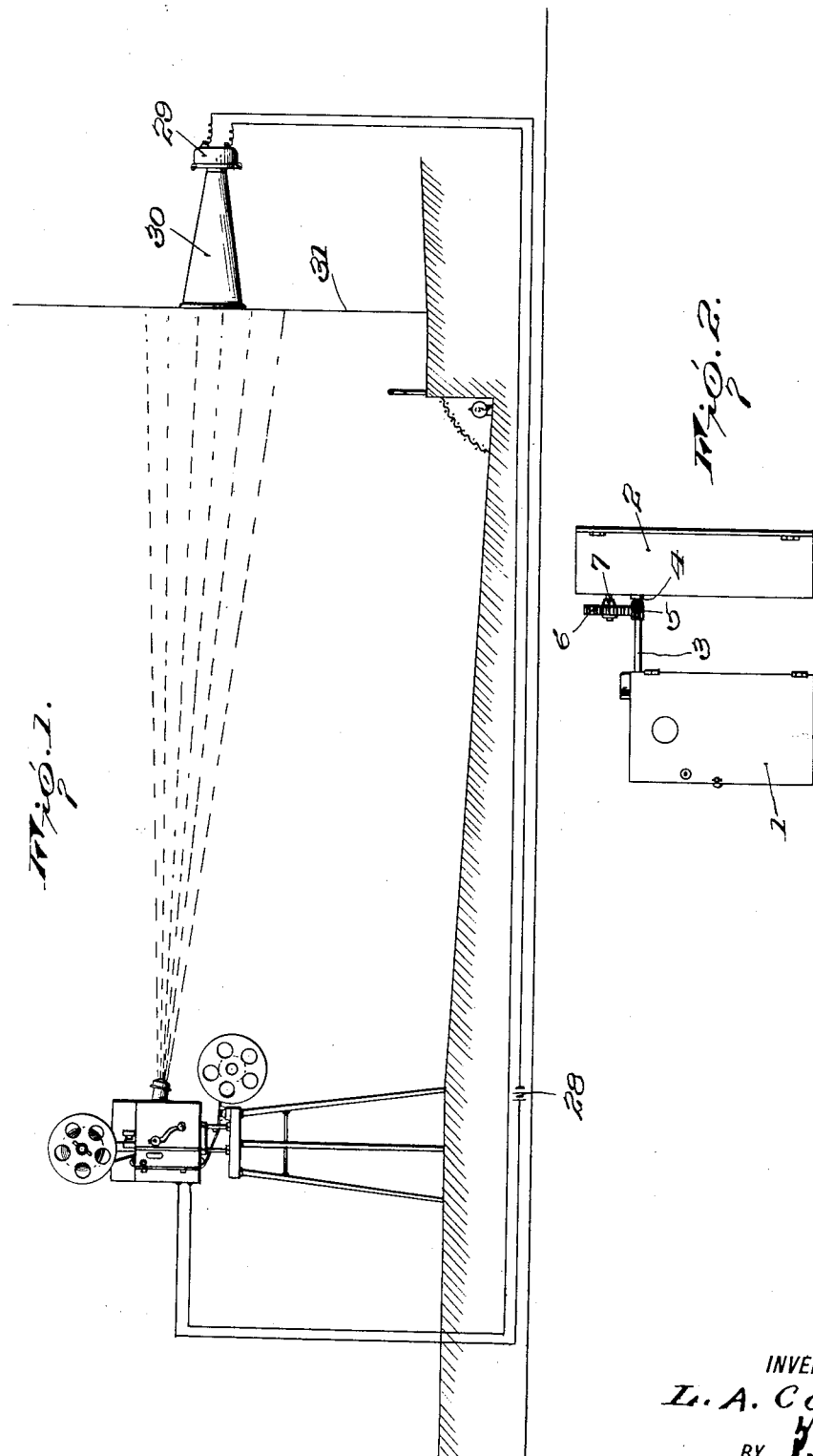

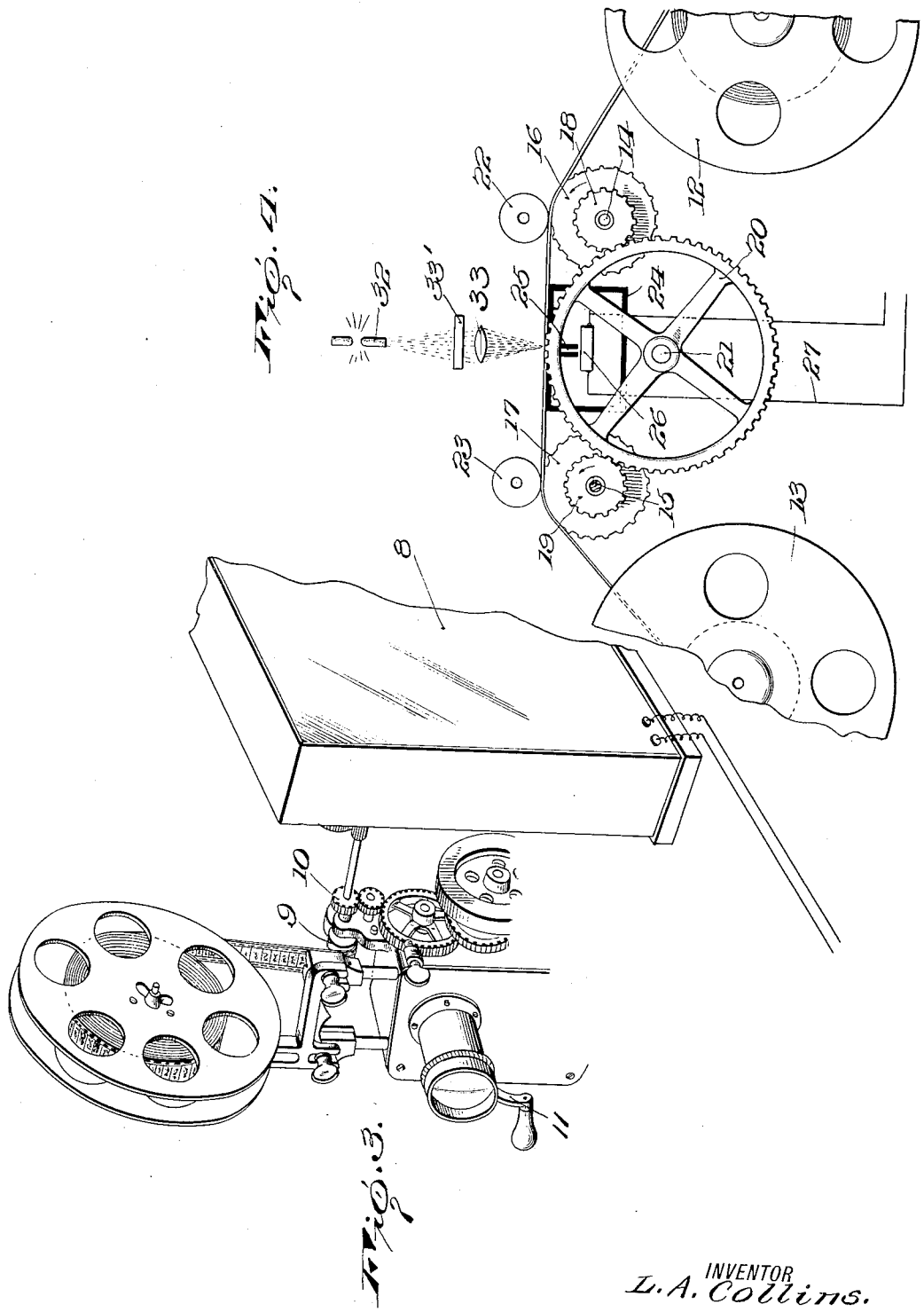

LEE A. COLLINS, OF LOUISVILLE, KENTUCKY.

METHOD OF AND APPARATUS FOR THE REPRODUCTION OF SOUNDS AND MOTIONS.

1,366,446.           Specification of Letters Patent.     Patented Jan. 25, 1921.

Application filed May 26, 1917. Serial No. 171,260.

*To all whom it may concern:*

Be it known that I, LEE A. COLLINS, a citizen of the United States, residing at Louisville, in the county of Jefferson and State of Kentucky, have invented certain new and useful Improvements in Methods of and Apparatus for the Reproduction of Sounds and Motions, of which the following is a specification.

This invention has as its object a novel method of and apparatus for the simultaneous reproduction of sound and picture records. Various methods have been proposed for the reproduction of picture and sound records in synchronism so that the exhibition of scenes would be accompanied by related sounds. It has been found impractical, however, to produce the desired results through the use of a purely mechanical means. For example, one method which has been tried but without success consists in the operation of a phonograph in conjunction with a motion picture projection machine. However, as phonograph records seldom, if ever, require more than eight minutes for their reproduction it becomes necessary to stop the operation of the projection machine in order to bring a new record into use, thus detracting from the faithfulness of the reproduction of the picture and sound records. Furthermore, in this method of reproducing picture and sound records it is practically impossible to operate the two reproducing means, namely the motion picture projection machine and the phonograph, in synchronism and it therefore not infrequently happens that when a certain scene is being projected the sounds at that time being reproduced by the phonograph will not relate to that particular scene or action but to some other scene or action. Even where the two machines are coupled for operation in unison this disadvantage is liable to present itself for the reason that films are frequently patched and in patching a film it is customary to cut out and discard a greater or less length of the film and if there are several patches in such a film the phonograph will, of course, run considerably behind the projection machine. Even where an unpatched film is employed it is practically impossible to secure perfect synchronism in the operation of the two machines by the employment of a mechanical connecting means for the phonograph must be placed back of or adjacent to the screen upon which the images are projected, whereas the motion picture projection apparatus is located a distance from the screen and it is, therefore, necessary to provide shafting and gearing mechanically connecting the two machines and extending beneath the floor of the theater or hall in which the machines are employed. Furthermore, in this method of reproduction of picture and sound records two operators are required, one for each machine, and it is an extremely difficult matter to so place the phonograph record upon the mandrel or revolving table and at the same time so thread the film into the projection machine that the sounds will be reproduced at the proper moment. It is, therefore, an aim of the present invention to provide a method of and apparatus for the reproduction of motion picture and related sound records in perfect synchronism.

The present invention contemplates the production, by any suitable method of a negative sound record from which may be printed, upon a photographically sensitized medium, a corresponding record which may be then employed in conjunction with the motion picture projection machine to reproduce the related sounds in synchronism with the projection of the motion pictures. Various methods may be employed in producing the negative record. For example, a photographically sensitized film corresponding to the ordinary film employed in motion picture cameras and projection apparatus, may be passed across a slit through which the rays from an electric light or the sun pass to the said film, a sound operated shutter being placed between the source of light and the said slit or where an electric light is employed a telephone transmitter may be placed in circuit therewith. This film is then developed in the usual manner and other films are printed therefrom and are employed by the method and in the apparatus embodying the present invention to reproduce the sound records. If desired instead of photographically printing the record from a negative film on to a sound film, the record may be printed upon an opaque strip of paper or other material photographically sensitized, and subsequently developed, or a strip or other medium coated with an opaque film as, for example, by a process of smoking, may be employed and a record made thereon through the medium of a recording point or blade acted upon by a diaphragm vibrated by sounds striking the same. In this manner, of course, a record will be produced corresponding to the negative record produced upon the photographic film and a print may be made therefrom upon a sensitized film in the same manner as above explained. In fact, a record could be made by employing a vibratory impression element supplied with ink or other substance designed to apply a coating, to a transparent film, of a greater or less width according to the degree of vibration and prints could be made photographically from a record thus produced, upon a photographically sensitized film. Another method which may be followed, consists in providing a telephone receiver with a mirrored diaphragm which is presented toward the slit and over the film. A steady light is thrown on to the mirrored diaphragm and the sounds, collected by a telephone transmitter in circuit with the said receiver, will cause the mirrored diaphragm of the said receiver to vibrate thereby causing variations in the intensity of the light rays reflected on to the film. The methods above briefly described employ a strip or film as will be noted. However, inasmuch as it has been proposed to take and project motion pictures through the employment of a revolving glass disk upon which the picture records are photographically impressed, the present invention contemplates the employment, in such event, of a similar sound record. Assuming that the sound record is produced by photographically impressing the record upon a sensitized film such as employed in a motion picture camera, the film feeding mechanism for the camera and the film feeding mechanism for the sound recording apparatus are more or less directly connected for operation in unison and in preparing the two mechanisms for use their respective films are threaded therein and operation of the camera mechanism will result in operation of the sound recording mechanism in synchronism therewith. Thus the sounds are recorded in exact synchronism with the related scenes or acts and positive films prepared from the two negative film records thus produced may be employed in a similar arrangement of a projection apparatus and sound reproducing apparatus to cause reproduction of the two records in synchronism.

The invention also, as before stated, contemplates the provision of an apparatus for reproducing the picture and sound records in synchronism.

In the accompanying drawings:

Figure 1 is a view illustrating diagrammatically the apparatus for and method of reproducing the sound and picture records;

Fig. 2 is a view illustrating diagrammatically a motion picture camera and a sound recording mechanism coupled for simultaneous operation;

Fig. 3 is a perspective view of a motion picture projecting machine and the sound reproducing apparatus embodying the invention;

Fig. 4 is a view in side elevation of the apparatus removed from its casing.

In Fig. 2 of the drawings there is illustrated diagrammatically a motion picture camera indicated by the numeral 1 and there is also shown in the said figure the casing for the sound recording apparatus, indicated in general by the numeral 2. The numeral 3 indicates a shaft which is connected with and driven from any suitable rotary element of the camera mechanism and which at its outer end seats in a bearing 4 upon a side of the casing 2 for the sound recording mechanism. A gear or pinion 5 is fixed upon the shaft 3 and meshes with a gear 6 fixed upon a shaft 7 which constitutes the drive shaft for the sound recording mechanism. As before stated, Fig. 2 is merely a diagrammatic representation of the sound and picture recording apparatuses and it will be understood that the gears 5 and 6 may be proportioned otherwise than as shown in the said figure. In other words, the gear 5 may be considerably larger than the gear 6 or the two gears may be proportioned as shown in the said figure, depending upon the construction of the two recording mechanisms and the relative rates of speed at which they are to be driven in order that the picture and sound records may be properly recorded and in synchronism. Thus it may be found expedient to feed the sound recording film at a higher rate of speed than the picture recording film or vice versa. As before stated, there are numerous methods whereby the sounds may be recorded and therefore no particular mechanism is shown in the drawings. It will be understood, however, that the final record produced is to possess the same characteristics as the picture record. In other words, if the picture record is in the nature of a film the sound record will also be in the nature of a film or strip bearing a photographic record of the sounds to be reproduced.

The sound reproducing apparatus embodying the present invention is mounted within a suitable casing indicated in general by the numeral 8, which casing is arranged beside the motion picture projection apparatus which is of the ordinary construction and includes a film feed sprocket 9 driven from a pinion 10, which pinion is in turn driven by a train of gearing set in motion by power such as the usual crank handle 11. The said sound reproducing apparatus includes a storage reel 12 for the film and a take-up reel 13. Mounted between the reels upon shafts 14 and 15, respectively, are film sprockets 16 and 17, these shafts respectively carrying also pinions 18 and 19 both of which mesh with a gear 20 fixed upon a shaft 21. Idle rolls 22 and 23 coact respectively with the film sprockets 16 and 17 and the film bearing the sound record is trained to pass between the said sprockets 16 and 17 and their respective idle rolls and is fed from the storage reel 12 to the take-up reel 13 through rotation of the sprocket. Such rotation may be accomplished by extending the shaft 15 to and connecting the same with the shaft for the pinion 10 or the shaft for the pinion 10 may be coupled in any suitable manner with the shaft 21. If desired, furthermore, any suitable gear connection may be provided between the film sprocket 9 or its pinion 10 and a rotary element of the sound producing apparatus. In any event the arrangement will be such that when the crank handle 11 is turned to feed the motion picture film, the sound reproducing mechanism will be actuated to so feed the sound record film that the sound and picture records will be reproduced in perfect syncronism. By providing gear connection between the two pinions 18 and 19, the film sprockets 16 and 17 are caused to rotate in unison and the stretch of film passing between these sprockets will maintain a flat and taut position and will not sag or buckle. The said stretch of film passes over a casing 24 from which light is excluded except for such rays as may pass through a narrow slit 25 or passage-way provided in the top of the casing. Located below this slit, which slit corresponds in dimensions to the slit through which the light rays from the manometric flame pass in producing the sound record, is a selenium cell 26. The said selenium cell is located wholly within the light tight casing and connected by an electric circuit 27 with a battery 28 and a loud speaking telephone 29, the horn of which, indicated by the numeral 30, is preferably positioned immediately in the rear of the screen 31 upon which the motion pictures are to be projected. An arc or other suitable light 32 is positioned so that its rays will fall upon the top of the casing 24, into which they may pass only through the slit 25. If desired a lens 33 or a cell 33', or both, containing a solution of alum or iodin may be interposed between the arc light 32 and the slit 25. It will now be understood that as the film bearing the sound record passes the slit 25, the light rays will be permitted to pass through the film and through the said slit with varying intensity, and acting upon the selenium cell 26 to vary the resistance thereof, the corresponding vibrations will be set up in the loud speaking telephone thus reproducing the sound. If desired either of the film sprockets 15 or 16 may be provided with some indicating mark to indicate to the operator the point to which the film is to be fed through the mechanism in order to position the advancing end of the film so that when the two mechanisms are actuated in unison, the first sounds reproduced will bear proper relation to the action being depicted upon the screen 31. If the element 33 is in the nature of a lens it may, of course, be adjusted to focus the light rays upon the slit 25 or if the light 32 is of such character as to give off great heat the element 33 will be in the nature of a cell containing an alum or iodin solution.

If instead of employing a more or less transparent film for the sound record, the said record is photographically printed upon a strip or film which is opaque and provided with a sensitized coating, the said strip or film and the source of light will be so placed that the light will be reflected from the surface of film or strip and through the slit 25 onto the selenium cell.

Should the scenes to be photographed to produce the picture record be enacted under such conditions that it would be impractical to obtain the desired sound record, the action may be photographed first and the picture record produced may then be projected on to the screen and at the proper moments the actors who enacted the scene or act may speak or produce the proper and related sounds directly into the transmitter of the sound recording apparatus.

It will be understood that any other substance or device, the electrical resistance of which is varied by variations in the intensity of light rays striking it, may be employed in lieu of the selenium cells. Also instead of employing the ordinary induction coil in the telephone circuit I may employ a sound amplifying device which is more sensitive than such a coil.

Having thus described the invention, what is claimed as new is:

In a sound reproducing apparatus, an outer casing, spaced film sprockets mounted therein and having sprocket shafts, pinions on said shafts, a light-tight inner casing mounted within the outer casing between said sprockets and provided in the top wall thereof with a slit, a gear common to both of said pinions coupling the sprockets to turn in unison for feeding a film across the top wall of the inner casing over said slit and maintaining the stretch of film between the sprockets taut, a selenium cell housed within the inner casing, a sound reproducing device and source of electrical energy in circuit with said cell, and a source of light for projecting light rays through the film and said slit upon said cell.

In testimony whereof I affix my signature.

LEE A. COLLINS. [L. S.]